E. C. AND R. NEALY.
PLOW.
APPLICATION FILED NOV. 14, 1916.
1,323,088.
Patented Nov. 25, 1919.
2 SHEETS—SHEET 1.
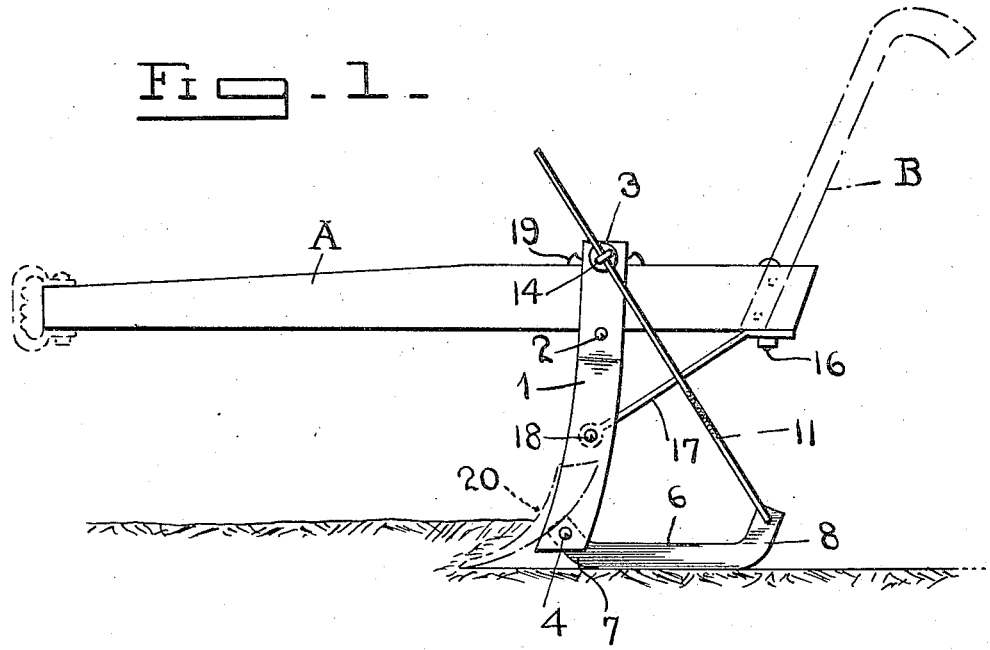
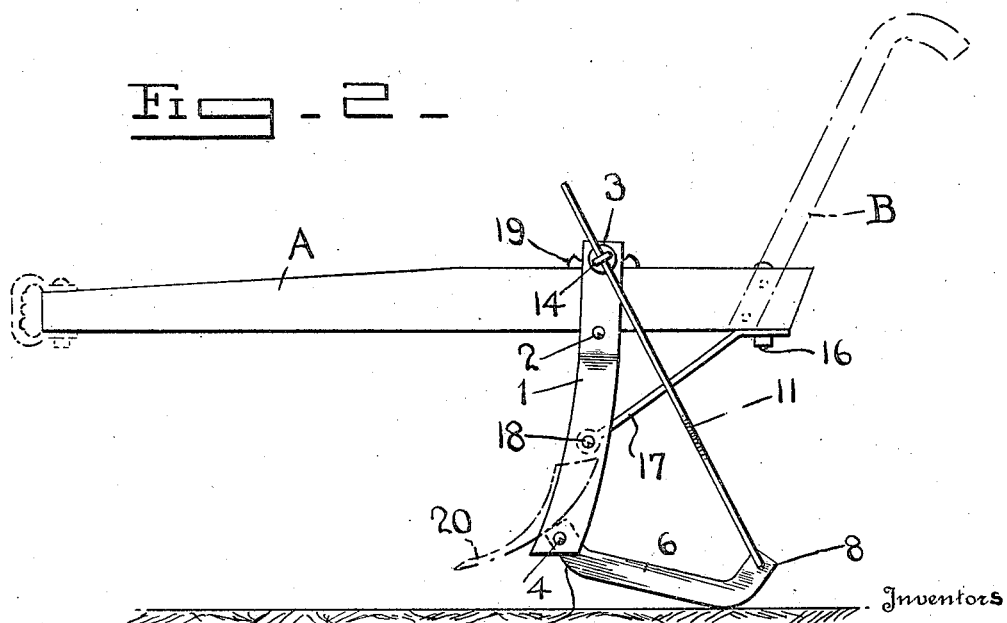
Inventors
E. C. Nealy &
R. Nealy
Attorney E. C. AND R. NEALY.
PLOW.
APPLICATION FILED NOV. 14, 1916.
1,323,088.
Patented Nov. 25, 1919.
2 SHEETS—SHEET 2.
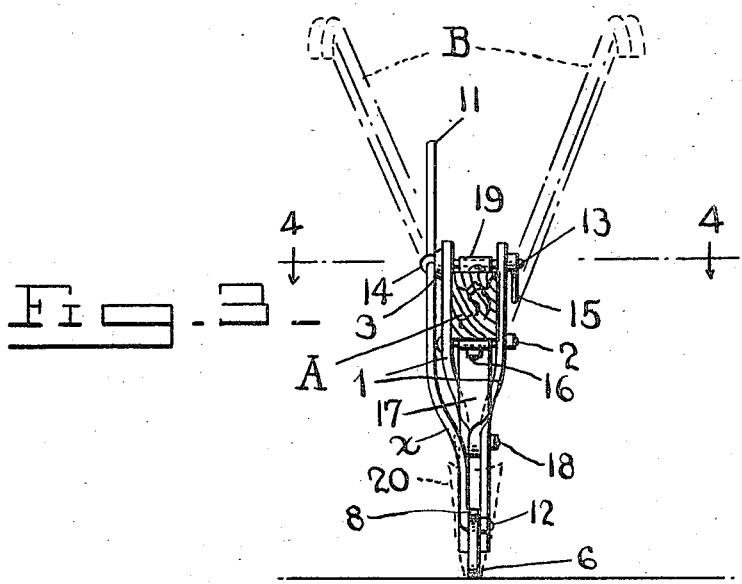
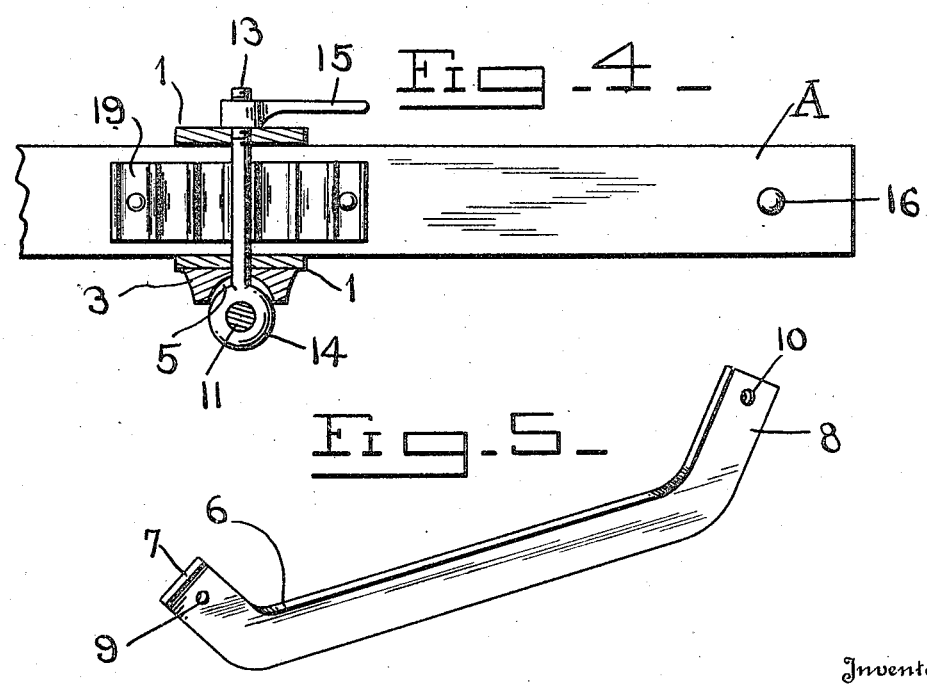
Inventors
E. C. Nealy
R. Nealy
By
Attorney

UNITED STATES PATENT OFFICE.

ELIAS C. NEALY AND ROSIER NEALY, OF SHUBUTA, MISSISSIPPI.

PLOW.

1,323,088.  Specification of Letters Patent.  Patented Nov. 25, 1919.

Application filed November 14, 1916. Serial No. 131,254.

*To all whom it may concern:*

Be it known that we, ELIAS C. NEALY and ROSIER NEALY, citizens of the United States, and residents of Shubuta, in the county of Clarke and State of Mississippi, have invented certain new and useful Improvements in Plows, of which the following is a specification, reference being had to the accompanying drawings, forming a part of this specification.

This invention has relation to certain new and useful improvements in plows, and comprises an attachment, secured to a plow standard, whereby the plow shovel can be accurately and precisely held in the proper line of advance.

Another objects is to provide a light, so called one-horse walking plow, with an attachment, whereby the depth of the shovel or blade may be accurately regulated.

A further object is to provide a plow standard attachment preventing lateral swerving of the plow blade while in use.

A still further object is to provide a plow, with a gage runner, whereby the weight of the plow is carried in going to and from the work-field.

With these and other objects in view the present invention consists in the combination and arrangement of parts as will be hereinafter more fully described and finally pointed out in the appended claim, it being further understood that changes in the specific construction shown and described may be made within the scope of the claim, without departing from the spirit of the invention.

In the accompanying drawings forming a part of this specification, and in which like numerals of reference refer to similar parts in the several views:

Figure 1 shows a side elevational view of the plow equipped with our attachment, the same being shown in its normal working position.

Fig. 2 shows a side elevational view of the plow with our attachment disclosing the rear end of the gage runner as depressed for raising the plow shovel.

Fig. 3 shows a rear end view.

Fig. 4 is a section on line 4, 4, of Fig. 3.

Fig. 5 shows a perspective view of the gage runner.

In our present invention we provide a light readily adjustable gage runner, adapted to be secured to the plow standard of any conventionally constructed one-horse walking plow, such as is employed in cultivating.

In the accompanying drawings the letter A designates the beam of a light or so called one-horse walking plow, and B the handles thereof.

Secured to the beam A is a plow standard, of conventional construction, presenting two similar members 1, which we secure to the plow beam by means of the usual lower bolt 2, while at their lowermost ends is the securing bolt 4.

Passing transversally through the upper ends of the standard 1, above the plow beam A is the eye bolt 13, whereby the standard is adjustably clamped to the beam, this eye bolt 13, performs a double function as will be described hereinafter.

Pivotally held upon the securing bolt 4, is the forward upturned curved end 7, of the flat gage runner 6. This gage runner is of a suitable width, and extends rearwardly of the standard, as is shown in Figs. 1 and 2.

Secured to the rear upturned curved end 8 of the flat gage runner 6, is the lower end 12 of the adjusting rod 11, which is offset at $x$ as shown in Fig. 3, so that the upper end of this adjusting rod 11, can readily pass through the eye 14 of the bolt 13, as will be understood in referring to Figs. 3 and 4.

Referring to Fig. 4, it will be noticed that the eye 14 is of a size smaller than the socket 5 of the disk 3, so that in screwing up the handle or wing nut 15 against the standard, the adjusting rod 11 will be firmly clamped to the outer flat face of the disk 3, as disclosed.

From the foregoing, it will be noticed, that the bolt 13 is employed, first, to clamp the standard to the plow beam and second, to hold the adjusting rod in its adjusted position.

As shown in Fig. 4 the eye bolt 13 is held within the rack plate 19 as is used in the art, permitting the plow standard to be moved forward and backward.

To further add stability to the standard, the same is held by means of the brace bar 17 which has its lower end secured to the pin 18. The upper end is secured to the bolt 16 passing through the plow beam.

Now in adjusting the rod 11, the gage runner 6, may be depressed to raise the plow so that the weight of the plow will be carried by the rear end of the gage runner, as is shown in Fig. 2, which is desirable when taking the plow to and from the work field.

As shown in Fig. 1, the lower riding edge of the gage runner 6, does not extend below the point of the plow shovel, so that the gage runner will ride upon the bottom of the furrow.

From the foregoing it may be seen that we provide a gage runner which can be adjusted with ease, accuracy and despatch and which serves in regulating the depth of the shovel or blade, as well as preventing any laterally swerving of the plow shovel or blade.

Having thus described our said invention, what we claim as new and desire to secure by Letters Patent is:

The combination with a plow beam of a standard of the character described, a clamping eye bolt passing through the upper end of said standard for clamping said standard to said beam, a pivot bolt held within the lower end of said standard, a flat drag bar held edgewise and having its ends curved upward pivotally secured at its forward end to said pivot bolt, an adjusting rod having its lower end pivotally secured to the rear upturned end of said drag bar, said adjusting rod passing through the eye of said bolt, and a handle nut on said eye bolt, whereby said standard is clamped to said beam and said rod is held against said standard, as and for the purpose set forth.

In testimony whereof we affix our signatures in the presence of two witnesses.

ELIAS C. NEALY.
ROSIER NEALY.

Witnesses:
M. C. PUGH,
W. T. BRITTON.